United States Patent
Terui et al.

[11] Patent Number: 6,124,881
[45] Date of Patent: Sep. 26, 2000

[54] SYSTEM FOR GENERATING COMPOSED SIGNALS OF MULTIPLE PICTURES FOR USE IN A VIDEO CONFERENCE SYSTEM

[75] Inventors: Yuichi Terui; Noriyuki Ihara; Tomohiko Awazu, all of Kawasaki; Makoto Hasegawa; Akifumi Arita, both of Yamanashi-ken, all of Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/946,567

[22] Filed: Oct. 7, 1997

[30] Foreign Application Priority Data

Apr. 25, 1997 [JP] Japan .................. 9-108612

[51] Int. Cl.$^7$ ................................. H04N 7/14
[52] U.S. Cl. ............................. 348/15; 709/206
[58] Field of Search ................ 348/578, 14, 13, 348/15–19; 379/93.01, 93.05, 93.08, 93.21, 93.17, 93.19, 202; 370/260; 709/204

[56] References Cited

U.S. PATENT DOCUMENTS

| | | | |
|---|---|---|---|
| 4,004,084 | 1/1977 | Brown et al. | 358/133 |
| 4,672,441 | 6/1987 | Hoelzlwimmer et al. | 358/135 |
| 5,010,399 | 4/1991 | Goodman et al. | 358/85 |
| 5,446,491 | 8/1995 | Shibata et al. | 348/15 |
| 5,548,324 | 8/1996 | Downs et al. | 348/15 |
| 5,568,184 | 10/1996 | Shibata et al. | 348/15 |
| 5,594,495 | 1/1997 | Palmer et al. | 348/17 |
| 5,600,646 | 2/1997 | Polomski | 370/263 |
| 5,621,429 | 4/1997 | Yamaashi et al. | 345/119 |
| 5,627,825 | 5/1997 | Barraclough et al. | 370/260 |
| 5,642,156 | 6/1997 | Saiki | 348/15 |
| 5,657,096 | 8/1997 | Lukacs | 348/585 |
| 5,737,011 | 4/1998 | Lukacs | 348/15 |
| 5,745,711 | 4/1998 | Kitahara et al. | 345/330 |
| 5,764,277 | 6/1998 | Loui et al. | 348/14 |
| 5,790,179 | 8/1998 | Shibata et al. | 348/15 |
| 5,793,415 | 8/1998 | Gregory, III et al. | 348/15 |
| 5,828,838 | 10/1998 | Downs et al. | 709/204 |
| 5,831,666 | 11/1998 | Palmer et al. | 348/17 |
| 5,835,129 | 11/1998 | Kumar | 348/15 |
| 5,867,653 | 2/1999 | Aras et al. | 395/200.34 |
| 5,953,050 | 9/1999 | Kamata et al. | 348/15 |

FOREIGN PATENT DOCUMENTS

| | | | |
|---|---|---|---|
| 59-229983 | 12/1984 | Japan . | |
| 06085937A | 9/1992 | Japan | H04M 3/60 |
| 04312090A | 11/1992 | Japan | H04N 7/15 |
| 08149441A | 11/1994 | Japan | H04N 7/15 |

*Primary Examiner*—Thomas G. Black
*Assistant Examiner*—Uyen Le
*Attorney, Agent, or Firm*—Staas & Halsey LLP

[57] ABSTRACT

A system generating composed signals of stable multiple pictures reduces a scale of hardware required for forming video signals sent from a plurality of terminals into one composed picture on a video conference system. A system generating composed signals of multiple pictures for use in a video conference system includes video conference terminals connected via a network, a multi-point control unit connected to the network for controlling transmission of video signals among the video conference terminals, and a multiple picture composer connected to the multi-point control unit for receiving video signals sent out from the video conference terminals through the multi-point control unit, and information showing a reducing ratio and display positions of the video signals. The multiple picture composer includes a scaling section reducing video signals corresponding to each of the video conference terminals according to the reducing ratio, and a gate circuit section controlling to output the video signals reproduced by the scaling section according to the display positions, thus generating composed signals of the video signals of the video conference terminals.

6 Claims, 18 Drawing Sheets

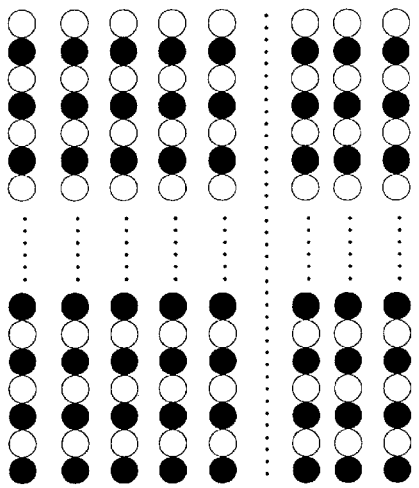
FIG. 10A
A STRUCTURE OF A LUMINANCE SIGNAL OF CICR601
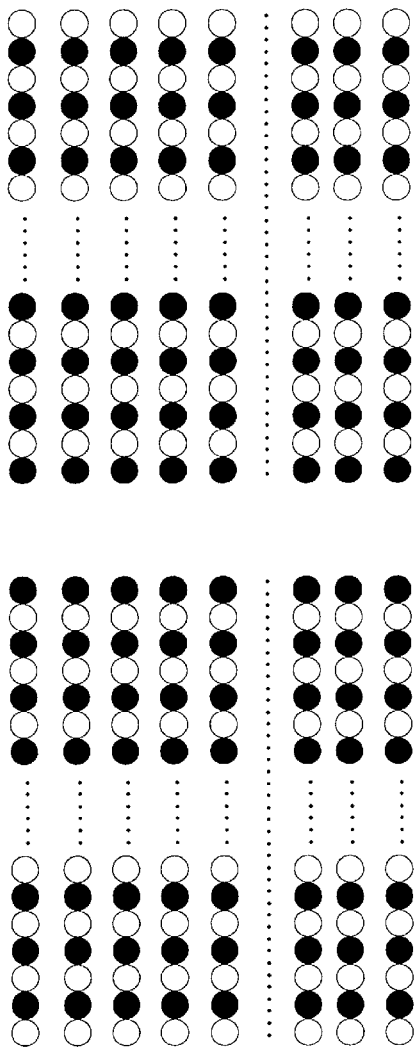
FIG. 10B
A STRUCTURE OF COLOR-DIFFERENCE SIGNAL U
FIG. 10C
A STRUCTURE OF COLOR-DIFFERENCE SIGNAL V
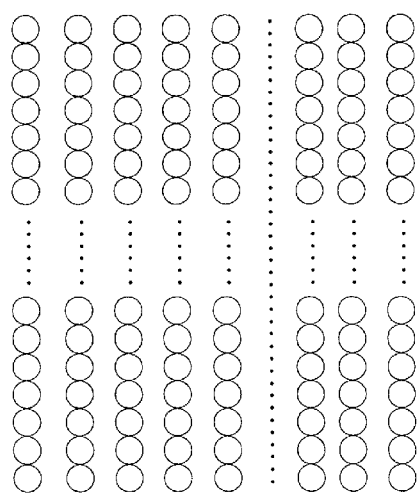
FIG. 10D
A STRUCTURE OF A LUMINANCE SIGNAL OF CICR601
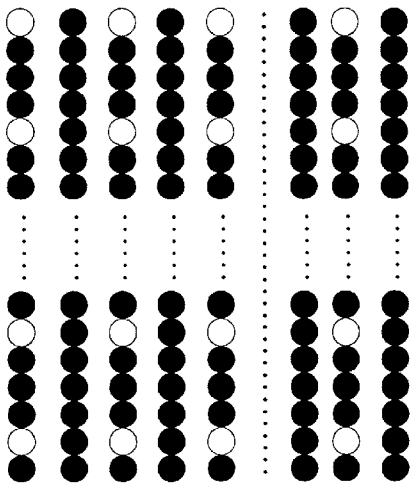
FIG. 10E
A STRUCTURE OF COLOR-DIFFERENCE SIGNAL U
FIG. 10F
A STRUCTURE OF COLOR-DIFFERENCE SIGNAL V
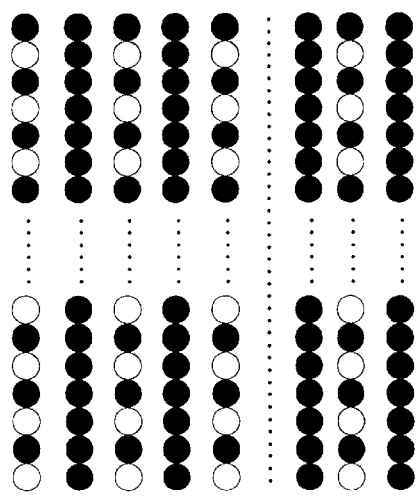

DIVIDING A SCREEN
INTO FOUR

DIVIDING A SCREEN INTO HALF
(BACKGROUND COLOR IN UPPER
AND LOWER SECTIONS)

DIVIDING A SCREEN INTO NINE
(BACKGROUND COLOR IN LOWER
RIGHT HAND SECTION)

DIVIDING A SCREEN INTO EIGHT
(A SPEAKER IN LOWER
RIGHT HAND SECTION)

ONE EXAMPLE OF
DIVIDING A SCREEN INTO SIX
(A SPEAKER IN LOWER
RIGHT HAND SECTION)

DIVIDING A SCREEN INTO SIXTEEN

1 H.261 DECODER YUV OUTPUT

2 H.261 DECODER YUV OUTPUT

3 H.261 DECODER YUV OUTPUT

4 H.261 DECODER YUV OUTPUT

5 H.261 DECODER YUV OUTPUT

6 H.261 DECODER YUV OUTPUT

7 H.261 DECODER YUV OUTPUT

8 H.261 DECODER YUV OUTPUT

0 H.261 ENCODER YUV INPUT

6,124,881

SYSTEM FOR GENERATING COMPOSED SIGNALS OF MULTIPLE PICTURES FOR USE IN A VIDEO CONFERENCE SYSTEM

BACKGROUND OF THE INVENTION

1. Field of the Invention

The present invention relates to a system for generating composed signals of multiple pictures according to video signals sent from a plurality of terminals. More particularly, it relates to a system for generating composed video signals used in a video conference system in which video display can be dynamically switched.

2. Description of the Prior Art

In recent years, video conference systems have been commercialized and the use of the systems has been widely expanded using personal computers as lower cost and high performance of hardware are realized. In such a situation, there is a great demand for realizing cost reduction and high performance of a multi-point control unit (MCU) necessarily used for a video conference system, in which terminals positioned on a plurality of locations and connected via a network concurrently may be employed to have a conference.

Further, as international standardization, new interfaces have been proposed for composing video signals sent from the plurality of locations to display composed pictures by the multi-point control unit (MCU).

SUMMARY OF THE INVENTION

Accordingly, it is an object of the present invention to provide a system for forming video signals sent from a plurality of terminals into one composed picture on a video conference system.

Further, it is another object of the present invention to provide a system for generating a composed signal of stable multiple pictures, by which a scale of hardware can be reduced.

BRIEF DESCRIPTION OF THE DRAWINGS

FIGS. 10A to 10F are explanatory diagrams of examples of scaling.

DESCRIPTION OF THE PREFERRED EMBODIMENT

Figure 1:
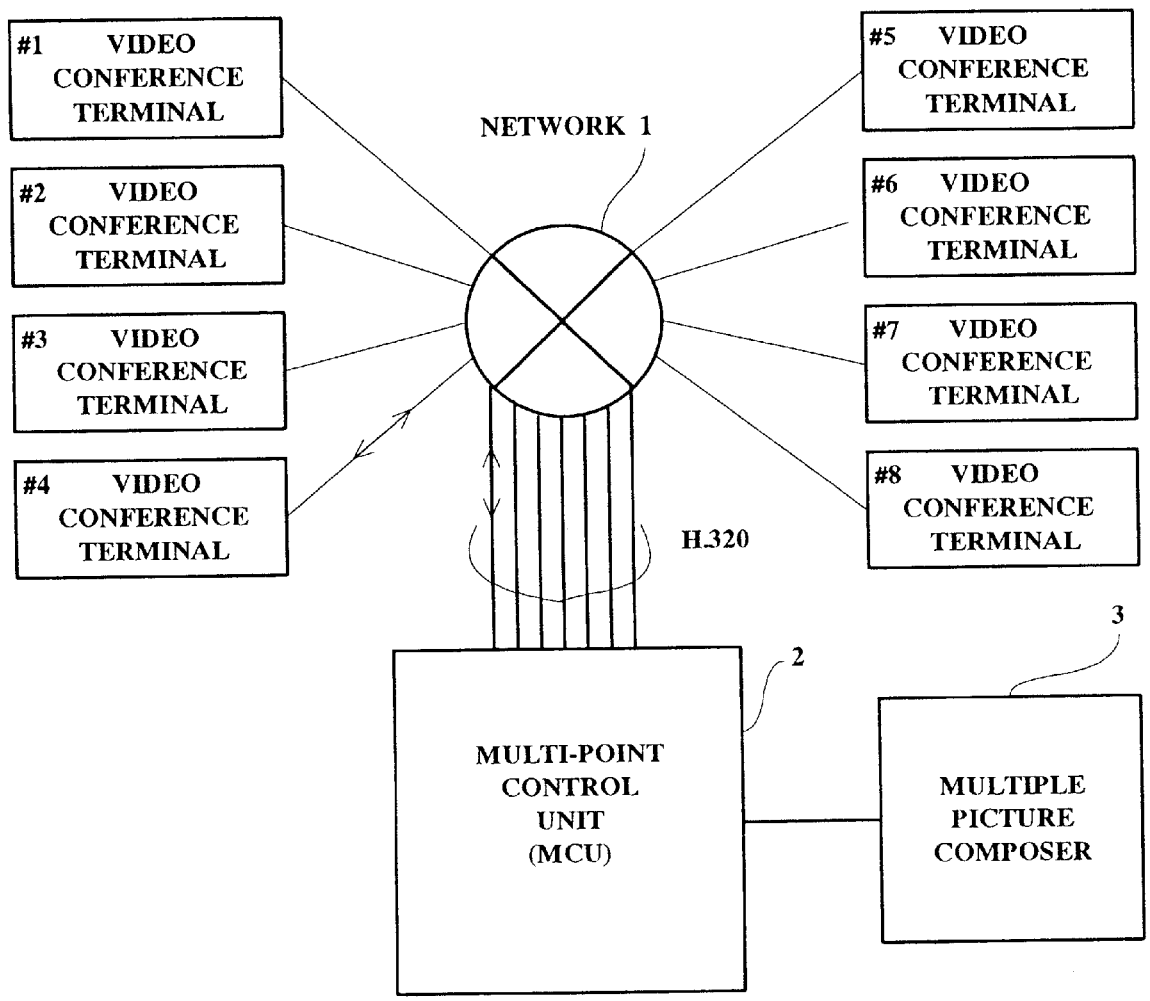
FIG. 1 shows a structural example of a video conference system employing a system for generating a composed signal of multiple pictures according to the present invention.

Embodiments according to the present invention will be explained in conjunction with the attached drawings. Throughout the following descriptions, the same reference numerals or symbols are used to denote and identify corresponding or identical components.

FIG. 1 shows a structural example of a video conference system employing a system for generating composed signals of multiple pictures according to the present invention. In FIG. 1, a plurality of video conference terminals #1 to #N are connected via a network 1. The video conference system includes a multi-point control unit (MCU) 2. Video signals are received and transmitted through the multi-point control unit 2 (MCU) between the plurality of terminals #1 to #N. That is, communications are facilitated between each video conference terminal and the multi-point control unit (MCU) 2 via the network 1, in a one to one manner.

Communications are facilitated between the multi-point control unit 2 and a network 1 according to H.320 protocol prescribed in ITU as well as communications between each of video conference terminals #1 to #N and the network 1. A multiple picture composer 3 is further connected to the multi-point control unit 2 according to the present invention.

The multiple picture composer 3 has a function for composing video signals sent from each of the video conference terminals #1 to #N into multiple pictures under control of the multi-point control unit 2. Therefore, video signals composed into multiple pictures are commonly sent from the multi-point control unit 2 to the video conference terminals #1 to #N.

The multi-point control unit 2 further controls the multiple picture composer 3 to select a video signal of a speaker among the television terminals #1 to #N and compose the selected video signal to be larger than other pictures sent from other video conference terminals in the composed multiple pictures.

Figure 2:
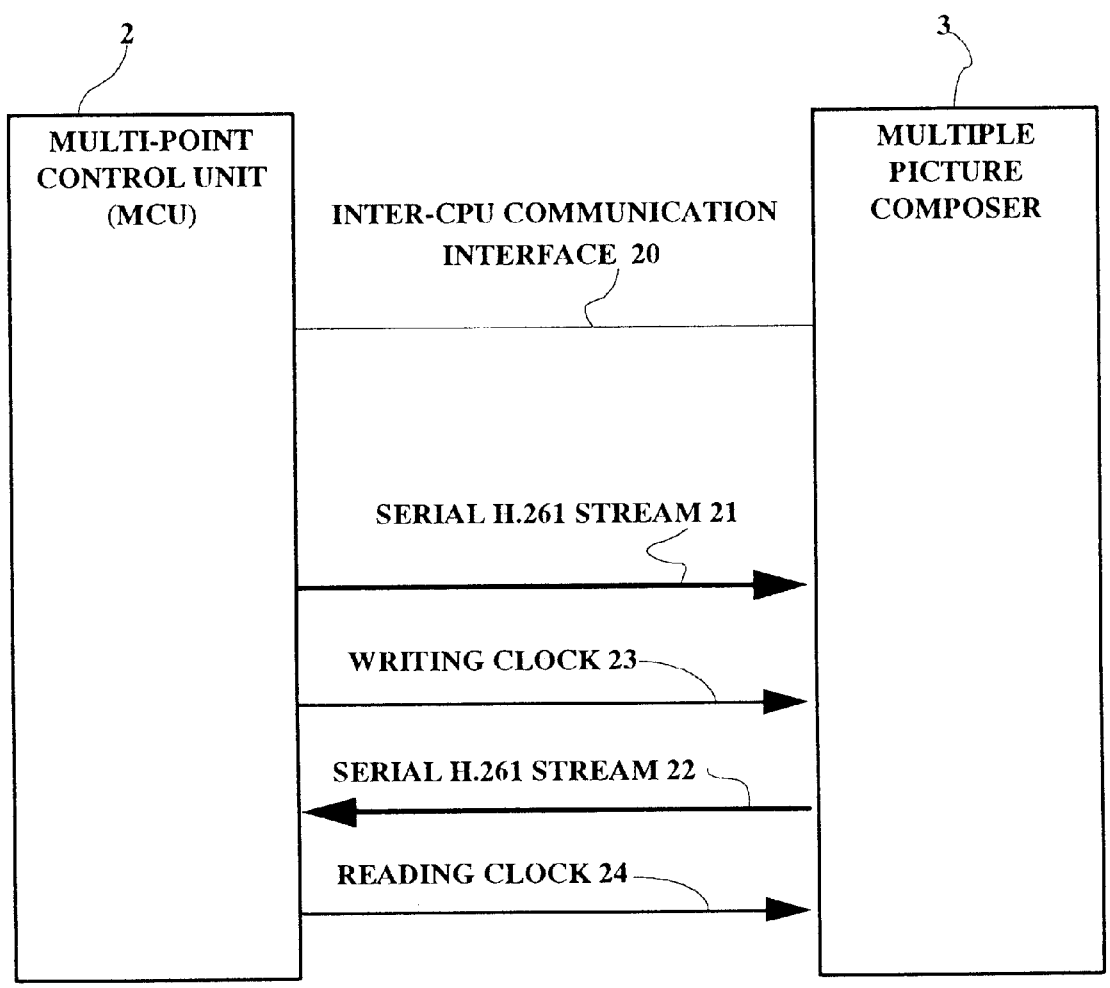
FIG. 2 is an explanatory diagram of an interface between a multiple picture composer and a multi-point control unit 1.

FIG. 2 shows an interface between the multiple picture composer 3 and the multi-point control unit 1 according to the present invention. In FIG. 2, an inter-CPU communication interface 20, sending and receiving interfaces 21 and 22 of H. 261 stream required or N locations, i.e., N video conference terminals, and interfaces 23 and 24 for writing and reading clocks corresponding each location supplied from the multi-point control unit 1 are provided for facilitating communications between a CPU of the multi-point control unit 1 and a CPU of the multiple picture composer 3.

In FIG. 2, an H. 261 stream means a series of signals having a compressed format generated according to a motion picture compression algorithm, which is a standard system for coding motion pictures based on ITU recommendation. It is serial data in which a frame is composed with a unit of 512 bits including error correction bits of 18 bits.

The multiple picture composer 3 receives the H. 261 streams corresponding to N locations and decodes the compressed video image data corresponding to the N locations. Then, the video image data is composed according to the present invention. After coding the composed video image data to an H. 261 stream again, the composer 3 sends the data corresponding to N locations to the multi-point control unit 2. Then, a control information for determining layouts of the pictures is sent from the above-described inter-CPU communication interface 20.

Figure 3:
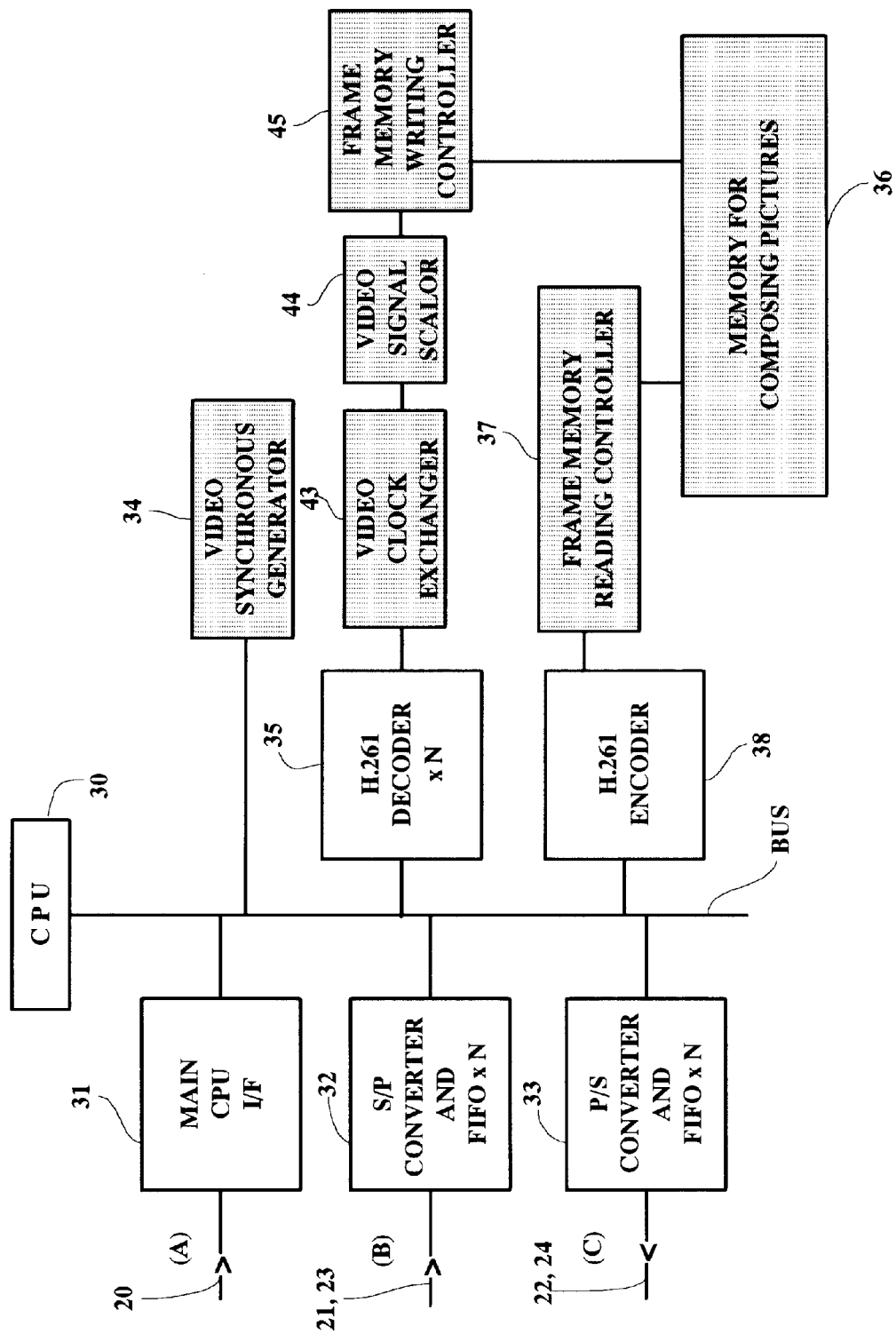
FIG. 3 is a block diagram showing a structural example of a multiple picture composer proposed before by the present applicant.

FIG. 3 shows a block diagram of a structural example of the multiple picture composer 3 that the present applicant has proposed before. The structure shown in FIG. 3 will be now explained to better understand a feature of the present invention.

In FIG. 3, the composer 3 includes a CPU interface 31 connected to an inter-CPU communication interface 20, a serial/parallel converter 32 connected to a serial H. 261 stream interface 21 and a writing clock interface 23, a parallel/serial converter 33 connected to a serial H. 261 stream interface 22 and a writing clock interface 24. N sets of those devices are provided in correspondence with N locations, each of which is connected to a CPU 30 through a bus.

A video synchronous signal generator 34 is further connected to a bus for generating and outputting synchronous signals supplied to each device as master clock signals. The synchronous signal includes a master pixel clock signal of 13.5 MHz, and a master vertical synchronous signal and a master horizontal synchronous signal.

The serial/parallel converter 32 includes FIFO memories for receiving the H. 261 streams sent from the multi-point control unit 2 in serial forms. The converter 32 converts the received serial signals n to parallel data of 16 bits in series or parallel, and stores the data in the FIFO memories once.

The parallel data of 16 bits stored in the FIFO memories of the serial/parallel converter 32 is inputted to N of the H. 261 decoders 35. Each H. 261 decoder 35 decodes the H. 261 stream sent out from the corresponding serial/parallel converter 32 and outputs it as the decoded video signal.

A video clock exchanger 43 replaces the timing of video signals sent from the N of H. 261 decoders 35 with that of a common master clock. The video signals of which the timing is replaced with to that of a common master clock are input to a video signal scalor 44. The video signal scalor 44 reduces the picture size in horizontal and vertical directions and reproduces the video signals. Then, the reduced video signals are temporarily stored in a memory 36 for composing pictures under a control of a frame memory writing controller 45.

The video signals once stored in the memory 36 for composing pictures are read out by a frame memory reading controller 37. Then, it is possible to compose multiple pictures and freely make their layouts by changing the order for reading out the signals from the memory 36 for composing pictures.

In this way, the video signals composed into multiple pictures are converted to the H. 261 stream in an H. 261 encoder 38. Then, the N of parallel/serial converters 33 respectively convert the H. 261 streams to serial signals, and send them to the serial H. 261 stream interface 22 through the FIFO memory.

Thus, the H. 261 streams of the video signals composed into multiple pictures are commonly sent to the plurality of video conference terminals connected to the network 1 through a multi-point control unit 2, and the composed picture is displayed on the corresponding terminal.

In here, the structure of the multiple picture composer 3 shown in FIG. 3 will be considered. The video output of the H. 261 decoder 35 is asynchronous. Therefore, a synchronous controller 351 is required for replacing the timing with that of a common master clock.

Further, the video signals must be once stored in a frame memory, i.e., a memory 36 for composing pictures, to compose to multiple pictures, and a frame memory having a capacity required for N locations and the corresponding writing and reading controllers should be required.

It is also required to increase the frequencies of writing clocks in proportion to the number of composed pictures as the number of composed pictures becomes larger because pictures are composed upon writing to and reading from the frame memory.

Therefore, if the multiple picture composer 3 having the structure shown in FIG. 3 is employed, a scale of a circuit becomes larger as numbers of locations to be composed are increased, thus requiring great expense.

The present applicant further considered to solve the above-described problem, and then, has realized a multiple picture composer in which multiple pictures can be composed with smaller numbers of the composed signals according to the present invention.

Figure 4:
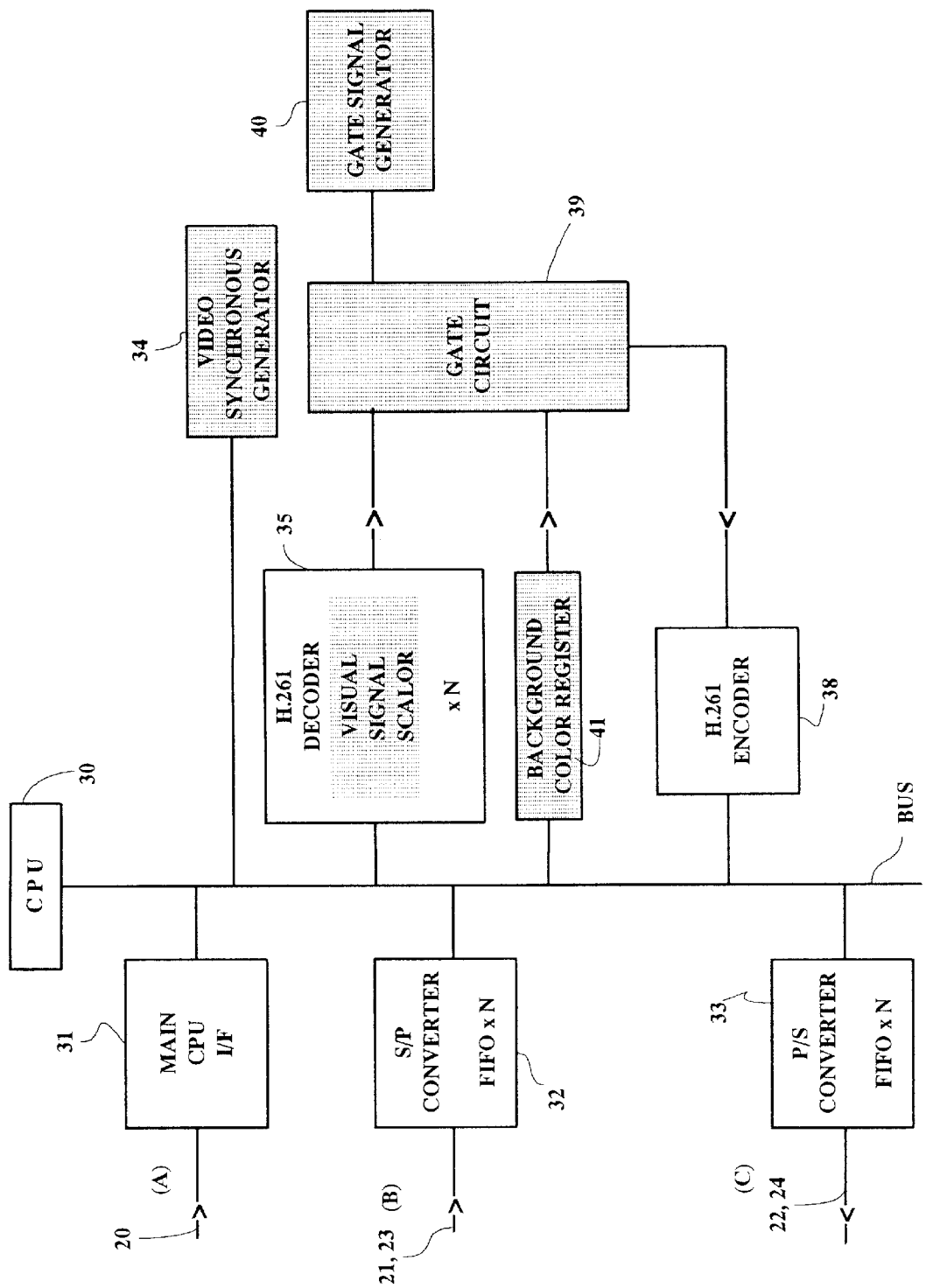
FIG. 4 is a block diagram showing a structural example of a multiple picture composer according to the present invention.

FIG. 4 is a block diagram of an outline of a structural example of a multiple picture composer according to the present invention corresponding to the structure shown in FIG. 3. In comparison with FIG. 3, sections shown with dotted squares are different parts. The multiple picture composer according to the present invention has a H. 261 decoder 35 including a function for reducing video signals and a gate circuit 39 to dynamically switch N of the reduced video signals.

Figure 5:
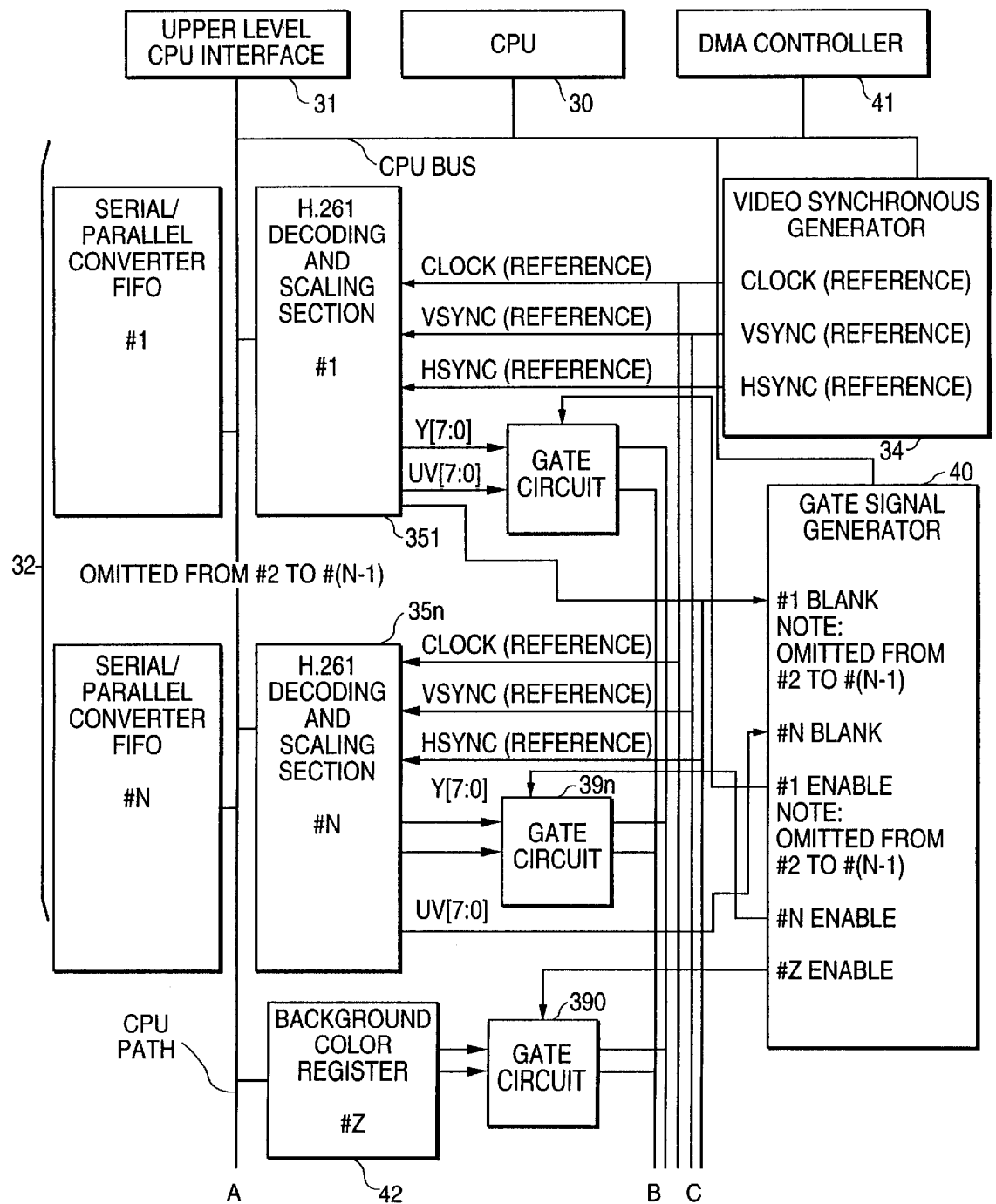
FIG. 5 is a part of a block diagram of a detailed structural example of a multiple picture composer according to the present invention.
Figure 6:
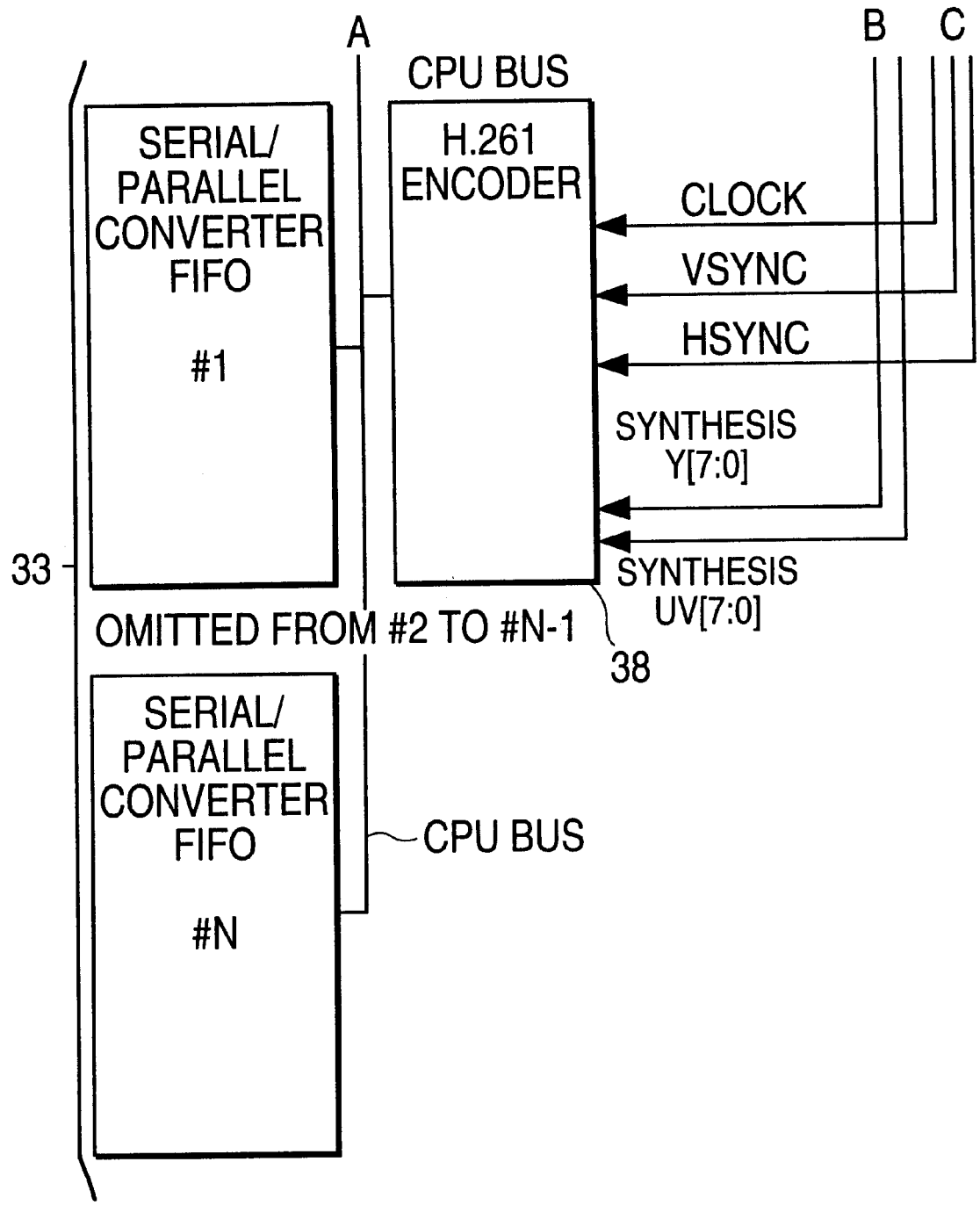
FIG. 6 is a remaining part of the block diagram of a detailed structural example of a multiple picture composer according to the present invention.

FIGS. 5 and 6 show detailed block diagrams corresponding to FIG. 4 by dividing two parts. Both parts are respectively connected with symbols A, B, and C. In FIGS. 5 and 6, a serial/parallel converter 32 includes N of converters #1 to #N. The H. 261 decoder 35 also includes decoding and scaling sections (#1 to #N) 351 to 35n.

In comparison with the structure shown in FIG. 3, the H. 261 decoder 35 includes a function for decoding the H. 261 streams and another function for reducing video signals to indicate the video image reduced according to the later-explained method. A structural example of each block shown in FIGS. 4 and 5 will be explained as follows.

Figure 7:
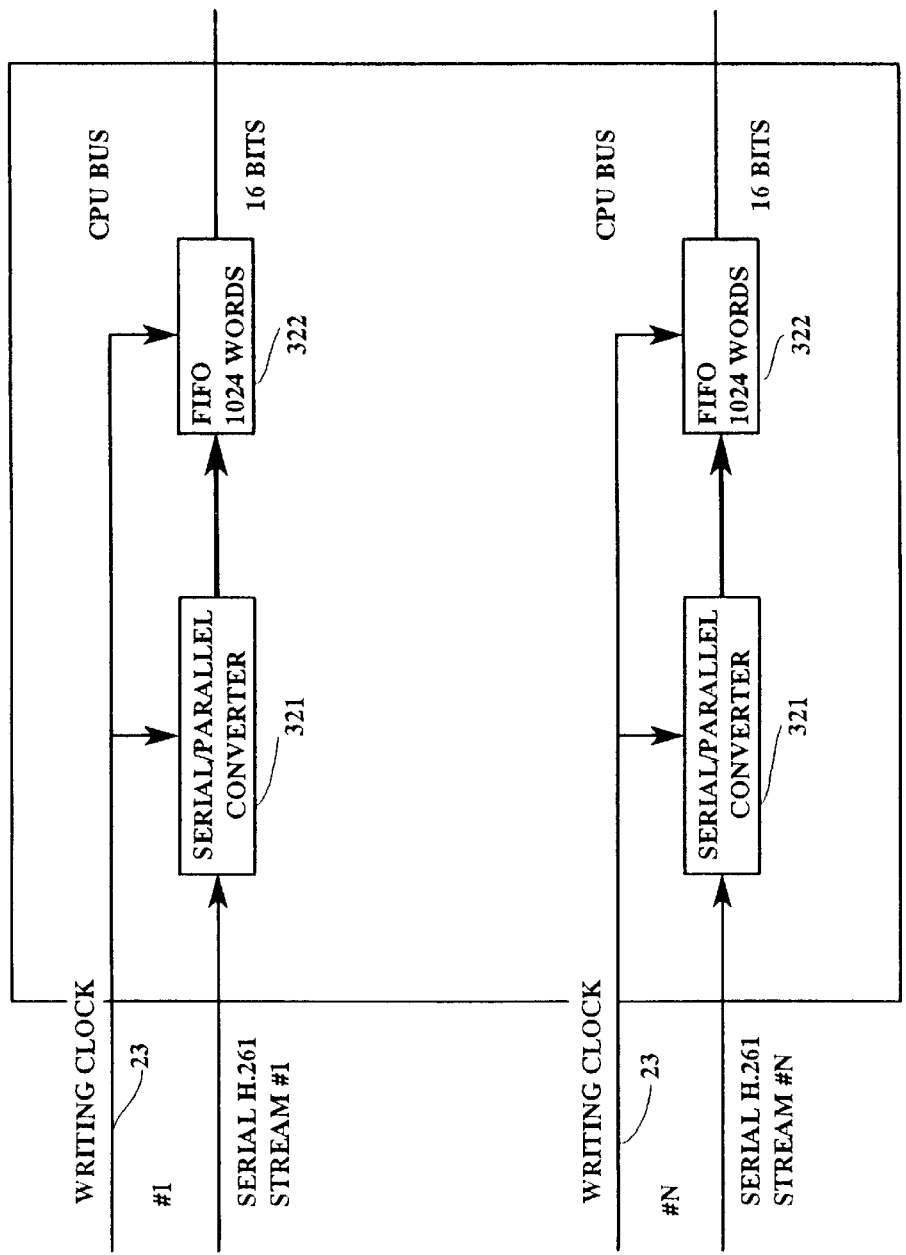
FIG. 7 shows a block diagram showing an embodiment of a serial/parallel converter 32.

FIG. 7 shows a block diagram of an embodiment of a serial/parallel converter 32. Each of N converters #1 to #N has a common structure and synchronizes with a writing clock 23. A serial H. 261 stream is written on each serial/parallel conversion register 321. After converting the serial H. 261 stream to a parallel signal, the parallel signal is written to a FIFO memory 32 as a parallel data of 16 bits. The FIFO memory 322 has a capacity required for 1024 words, and data per 16 bits is read in such an order as the data first written is first read out.

Figure 8:
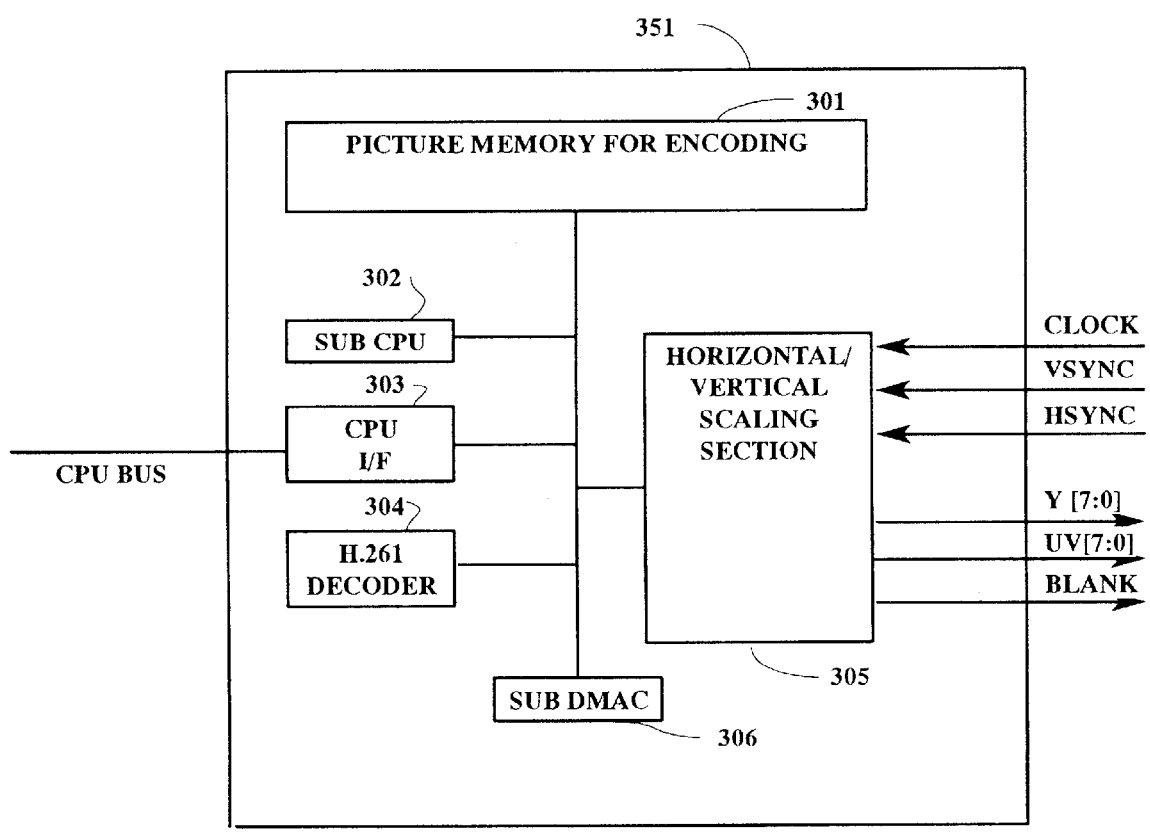
FIG. 8 shows a block diagram of a structural example of a decoding and scaling section 351.

In here, the H. 261 decoding and scaling sections (#1 to #N) 351 to 35n of the H. 261 decoder 35 commonly use the same structure. Therefore, only a structural example of a decoding and scaling section #1 is shown in FIG. 8. The decoding and scaling section 351 inputs the H. 261 stream converted in parallel sent from the serial/parallel converter 32 under control of a DMA controller 41.

The inputted H. 261 stream is a compressed and coded signal that is generated as follows. First, a signal having an NTSC signal-format is performed NTSC-CIF (Common Intermediate Format) conversion to commonly use with signals having different formats, such as PAL or SECAM. An inter frame difference is obtained from the signal which the NTSC-CIF conversion is performed to compress a part of a motion picture, in which motion is small. Further, an intra-frame difference is obtained to prevent from accumulating errors at a regular interval.

Discrete Cosine Transform is implemented to the differential signals obtained in the above-described steps. After quantizing these signals, variable-length coding is performed to the converted signals. Further, an error correction frame is added to the signal to which the variable-length coding is performed.

Therefore, a processing reversed to the above-described compression code generating steps of the H. 261 is executed in the decoding and scaling section 351 as a decoding function. Decoding is executed in the decoder 304. A sub DMA controller 306 operates to write the H. 261 stream received from the CPU interface 303 in a video storage 301 for decoding once.

As described according to the H. 261 decoder 304, a decoding is executed to the signals written in the video storage 301 by the reversed processing to the H. 261 stream generating steps.

The H. 261 decoder 304 releases the error correction frame at first. Decoding is executed on the signals which variable-length coding is performed. Then, inverse quantization and inverse discrete cosine transform are implemented on the decoded signals. The signals to which the above-described inverse transformation processing is implemented are added to a difference between an inter-frame and an infra-frame in each frame. To obtain the required format of NTSC signals, CIF-NTSC transformation is implemented.

In this way, the signal is decoded to a CCIR601 signal and rewritten on the above-described picture memory 301.

Scaling is executed to the CCIR601 signal rewritten on the motion picture memory 301 for encoding. In here, information of a reducing ratio and display coordinate position is sent from the multi-point control unit 2 to the sub CPU 302 through an upper level CPU interface 31 (refer to FIG. 5) composed of dual port RAMs and a CPU interface 303.

Figure 9:
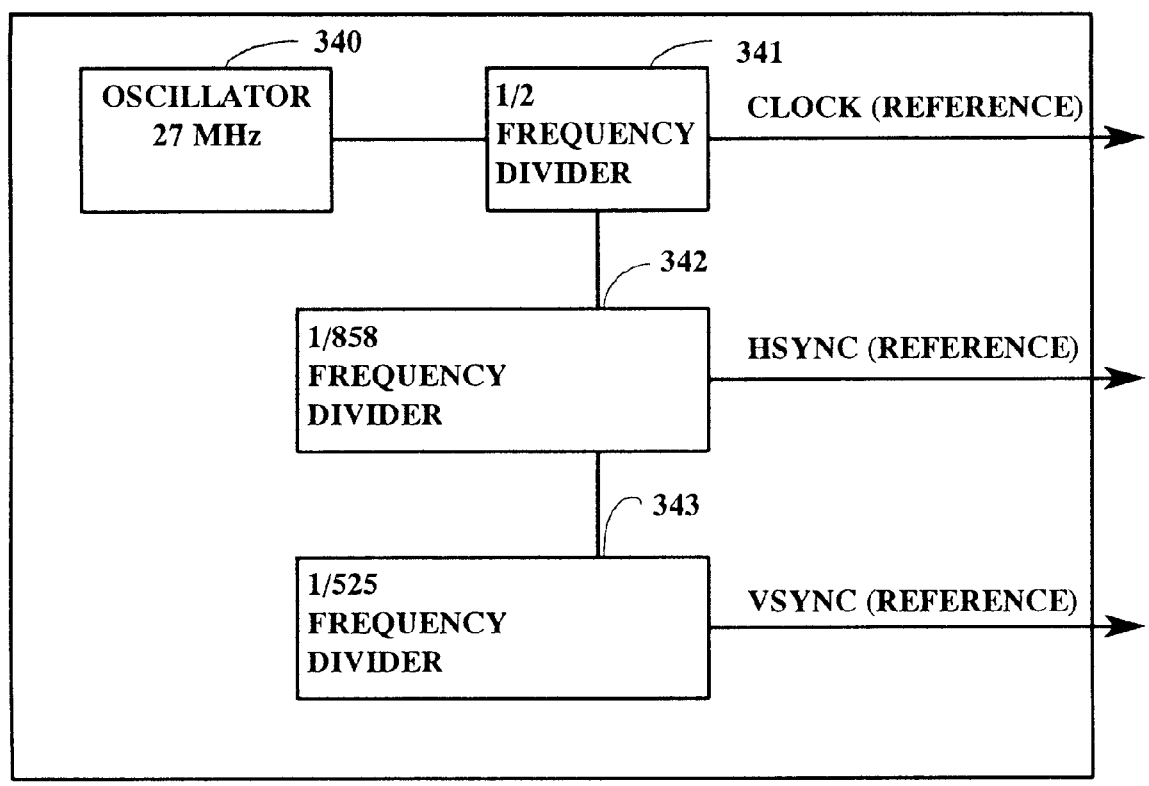
FIG. 9 is a block diagram of a structural example of a video synchronous signal generator 34.

The sub CPU 302 controls a horizontal/vertical scaling section 305 according to the information of the reducing ratio and the display coordinate position. The horizontal/vertical scaling section 305 inputs a clock CLOCK, a vertical synchronous signal VSYNC, and a horizontal synchronous signal HSYNC from the video synchronous signal generator 34 shown in FIG. 9 as reference.

The video synchronous signal generator 34 divides the frequency of the output of the oscillator of 27 MHz into half by a ½ frequency divider 341 to be a reference clock CLOCK of 13.5 MHz in this example. The vertical synchronous signal VSYNC and the horizontal synchronous signal HSYNC are respectively outputted through a 1/858 frequency divider 342 and a 1/525 frequency divider 343.

Horizontal and vertical scaling is executed and the display coordinate is assigned to the CCIR601 signal written in the motion picture memory 301 for encoding according to the reducing ratio and the information of the display coordinate position that are recognized by the above-described memory 301 by composing with these timing signals.

As the result, blank signals BLANK are outputted corresponding to parts, in which motion pictures are not displayed, along with Y, U, and V signals that form the reduced motion pictures. The horizontal and vertical scaling is executed with ½, ⅓, or ⅔, for example.

In here, although a color video signal is basically composed with RGB signals that are optical primaries, it is required in a video conference system to transmit color video signals having a great deal of data in the limited capacity of transmission lines with high quality.

Accordingly, it is not enough only to compress the data with the use of inter-frame difference as described above. Therefore, it is prescribed in H. 261 system to be a ratio of luminance data 4 to color data 2 by employing a character such as human visual is sensitive to brightness (luminance) changes, but not to color changes.

However, if video image data of R, G, and B components that is a signal formed by mixing luminance and color signals is employed to code the motion picture, it becomes impossible to use an efficient method, such as the luminance and color signals are individually processed. Therefore, the video signal employed in the present invention is sent by making a ratio of the luminance signal Y and the color-difference signals U and V obtained from the RGB signal become 4:2:2, for example.

FIGS. 10A to 10F are diagrams for explaining the above-described scaling example. In the example, the signals are compressed to half in the horizontal and vertical directions. In a ratio of Y:U:V=4:2:2, luminance and color signals Y, U and V are inputted to the horizontal/vertical scaling section 305. In FIG. 10, ○ means data exists and ● means no data exists in the horizontal and vertical scaling section 305.

FIG. 10A shows a structure of a luminance signal Y of CCIR601. On the contrary, structures of color-difference signals U and V in which data exist every other one are shown in FIGS. 10B and 10C. The reducing ratio ½ and the information of display coordinate position are sent from the multi-point control unit 2 to the sub CPU 302. Signals are thinned according to the information of the reducing ratio ½ sent to the sub CPU 302 to compress the signals on the statuses shown in FIGS. 10A, 10B, and 10C to half in the horizontal and vertical directions. Those statuses are respectively shown in FIGS. 10D, 10E and 10F.

In this way, data information compressed by the horizontal and vertical scaling section 305 of the H. 261 decoder 35 is inputted to the corresponding gate circuits. The gate circuits 391 to 39n are included corresponding to the decoding and scaling sections 351 to 35n, and these structures are the same.

Figure 11:
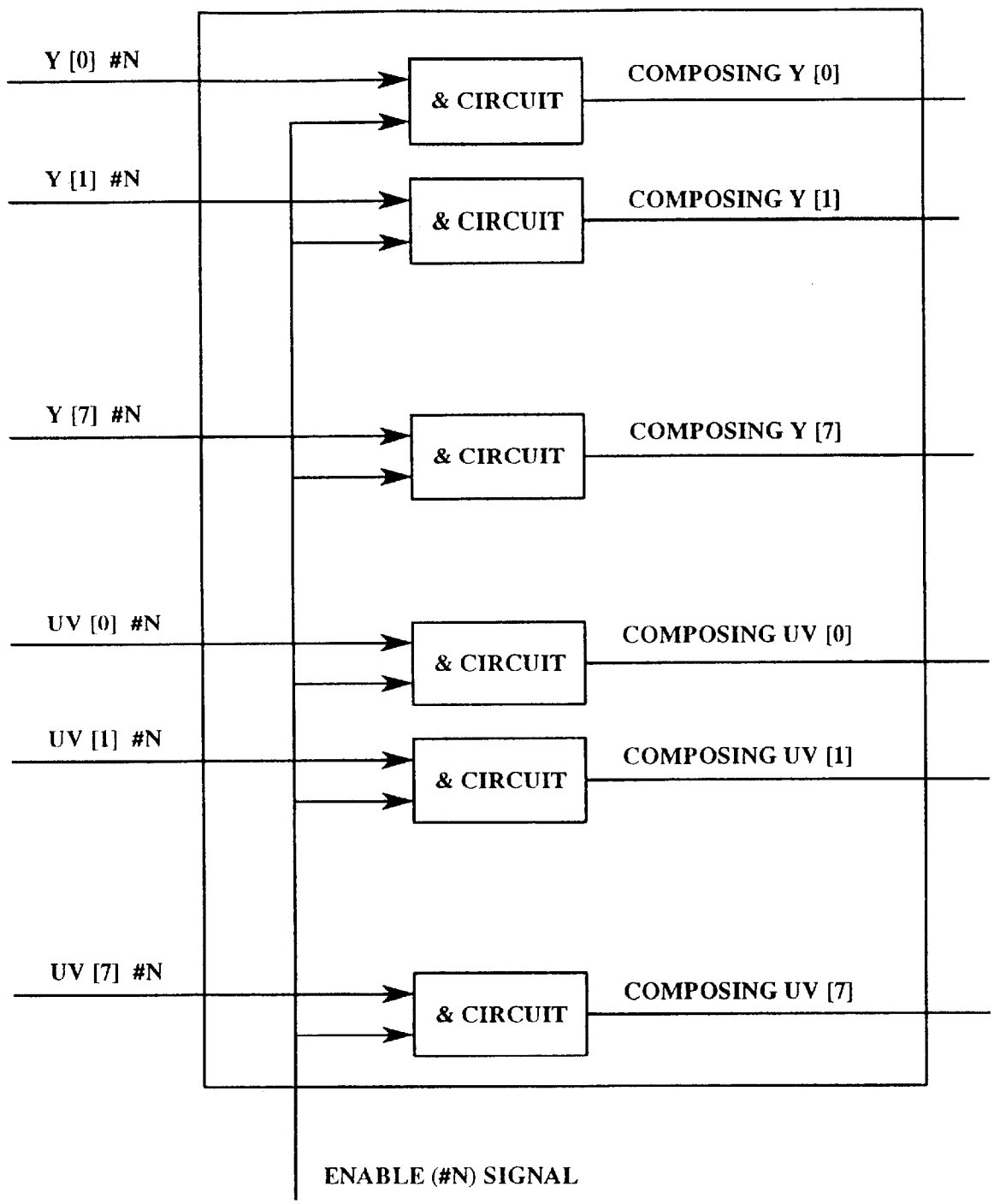
FIG. 11 shows one example of gate circuits 391 to 39n.

FIG. 11 is an example of the gate circuits 391 to 39n, which includes AND gates for 8 bits of each of the luminance signal Y, and the color-difference signals U and V.

Each bit of 8 bits respectively for the luminance and the color-difference signals Y, U, and V sent from the horizontal and vertical scaling section 305 is inputted to one input terminal of each AND gate. An enable signal ENABLE from a gate signal generator 40 is commonly inputted to other input terminal of each AND gate.

The enable signal ENABLE is generated by the gate signal generator 40 according to each blank signal BLANK on each of the N locations received from the H. 261 decoder 35. It becomes possible to output only a valid video area according to the generated enable signal ENABLE.

Figure 12:
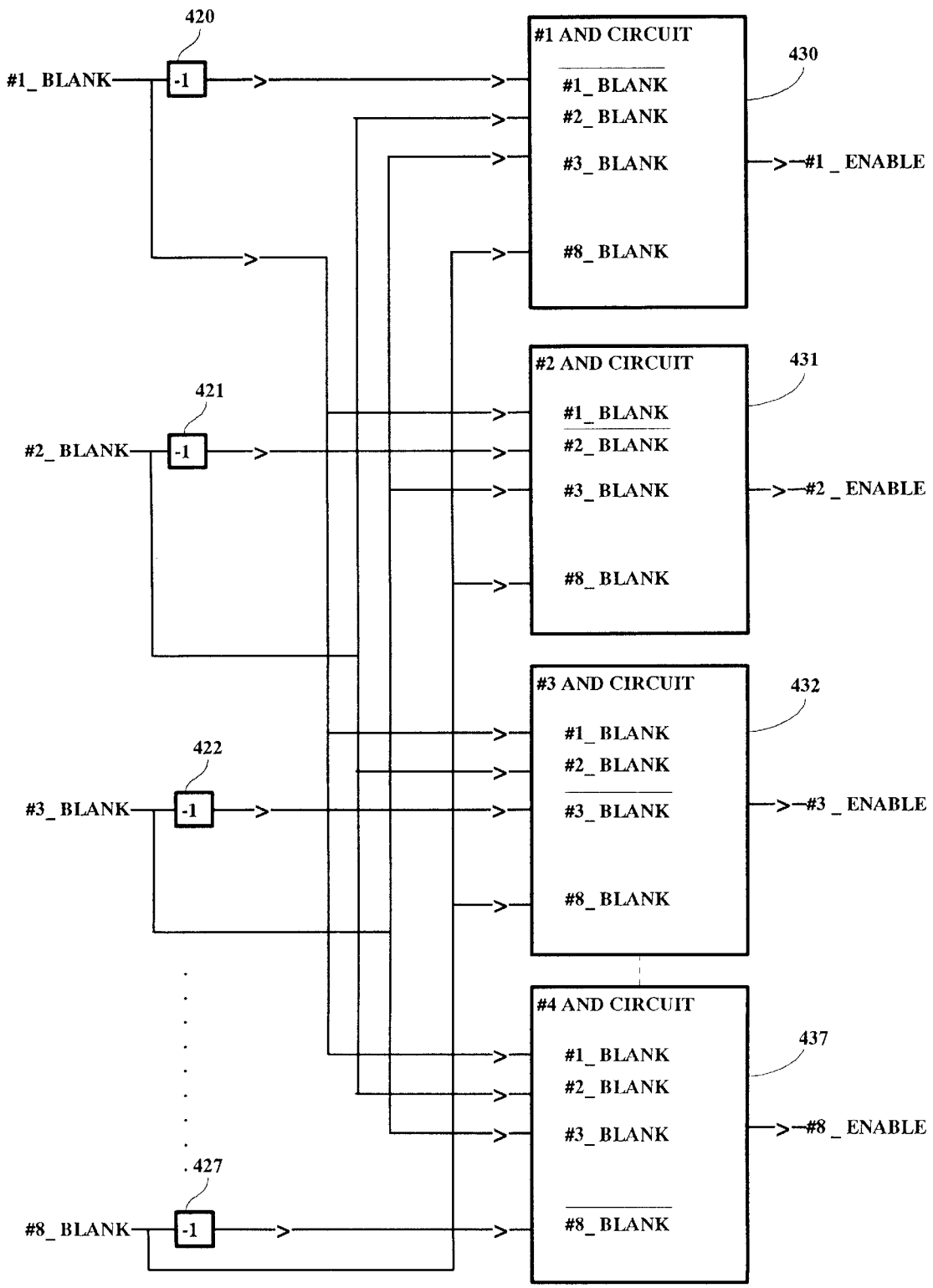
FIG. 12 is a block diagram of a structural example of a gate signal generator 40.

FIG. 12 is a structural example of the gate signal generator 40. In this example, the structure shows the video conference terminals are 8 locations. The structure includes eight AND gates 430 to 437 and inverters 420 to 427. Eight blank signals BLANK are respectively inputted to the AND gates 430 to 437. Then, the appropriate blank signals BLANK are reversed and inputted by the inverters.

Therefore, the enable signals ENABLE outputted from each of the AND gates 430 to 437 are according to the following logical equations:

1_ENABLE = $\overline{(\#1\_BLANK\&\ \#2\_BLANK\&\ \#3\_BLANK\&\ \ldots\ \&\ \#8\_BLANK)}$

2_ENABLE = (#1_BLANK& $\overline{\#2\_BLANK}$& #3_BLANK& . . . & #8_BLANK)

3_ENABLE = (#1_BLANK& #2_BLANK& $\overline{\#3\_BLANK}$& . . . & #8_BLANK)
4_ENABLE = (#1_BLANK& #2_BLANK& #3_BLANK& . . . & $\overline{\#8\_BLANK}$)

Figure 13:
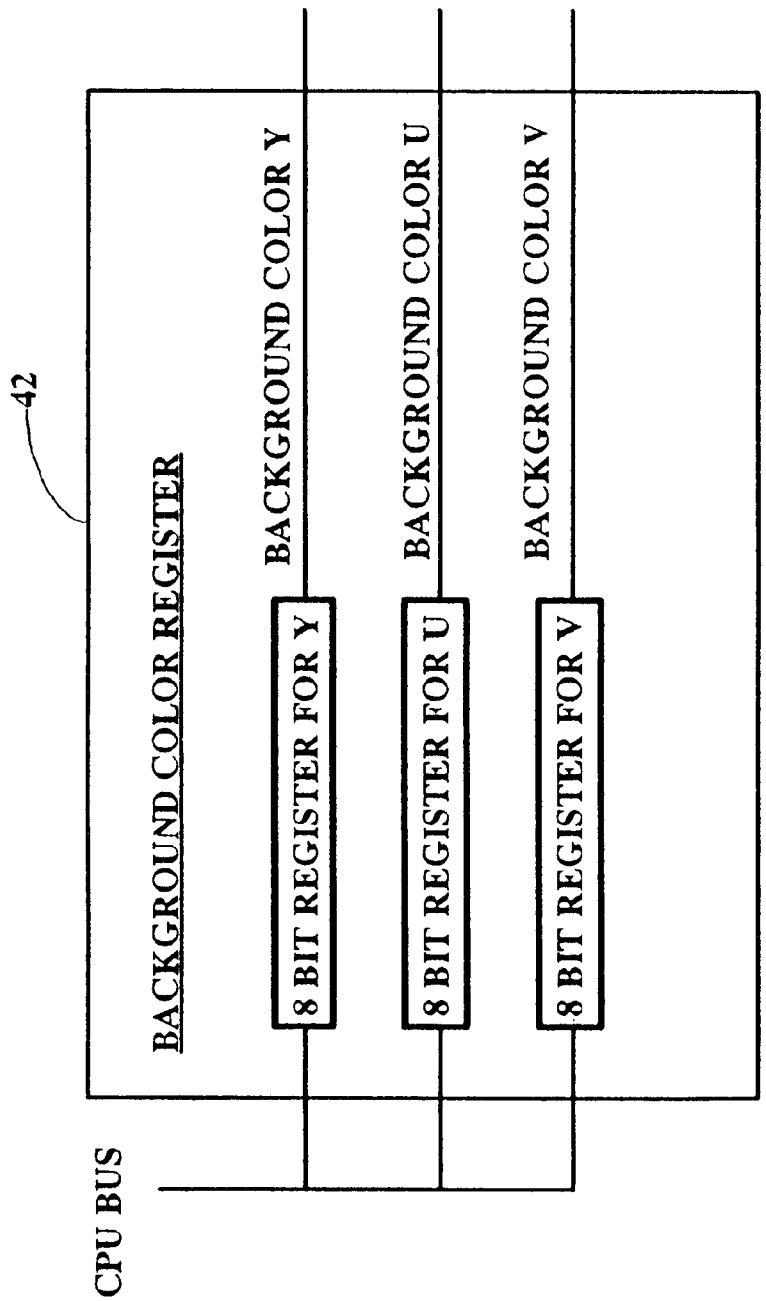
FIG. 13 is a block diagram of a structural example of a background color register 42.

Returning back to FIGS. 4 and 5, the multiple picture composer 3 includes a background color register 41 commonly used in the H. 261 decoding and scaling sections 351 to 35n. It is possible to set per 8 bits of each of a luminance signal Y and color-different signals U or V on the background color register 41 explained as one example shown in FIG. 13. The CPU 30 can optionally set the resister. Therefore, it becomes possible to express 256×256×256= 16,777,216 colors.

As shown in FIGS. 4 and 5, the outputs from the background color register 41 are outputted through a gate circuit 390. The gate circuit 390 has the same structure as that of the gate circuit shown in FIG. 11. However, the gate circuit 390 is controlled to be active by an enable signal ENABLE (#Z) sent from the gate signal generator 40.

An enable signal ENABLE (#Z) generator for the gate circuit 390, not shown in FIG. 12, in the gate signal generator 40 generates enable signals ENABLE (#Z) by the following logical equation:

ENABLE(#Z)=BLANK(#1)& BLANK(#2)& . . . & BLANK(#N−1)& BLANK(#N)

In this equation, the ENABLE (#Z) is an enable signal given to the background color register 41 that shows inactive areas of all locations and is given by a logical multiplication of BLANK signals #1 to #N.

The above-described outputs of the gate circuits 390 to 39n are inputted to H.261 encoder 38 through a bus. A reference clock sent from the video synchronous signal generator 34 is further inputted to the H. 261 encoder 38.

Figure 14:
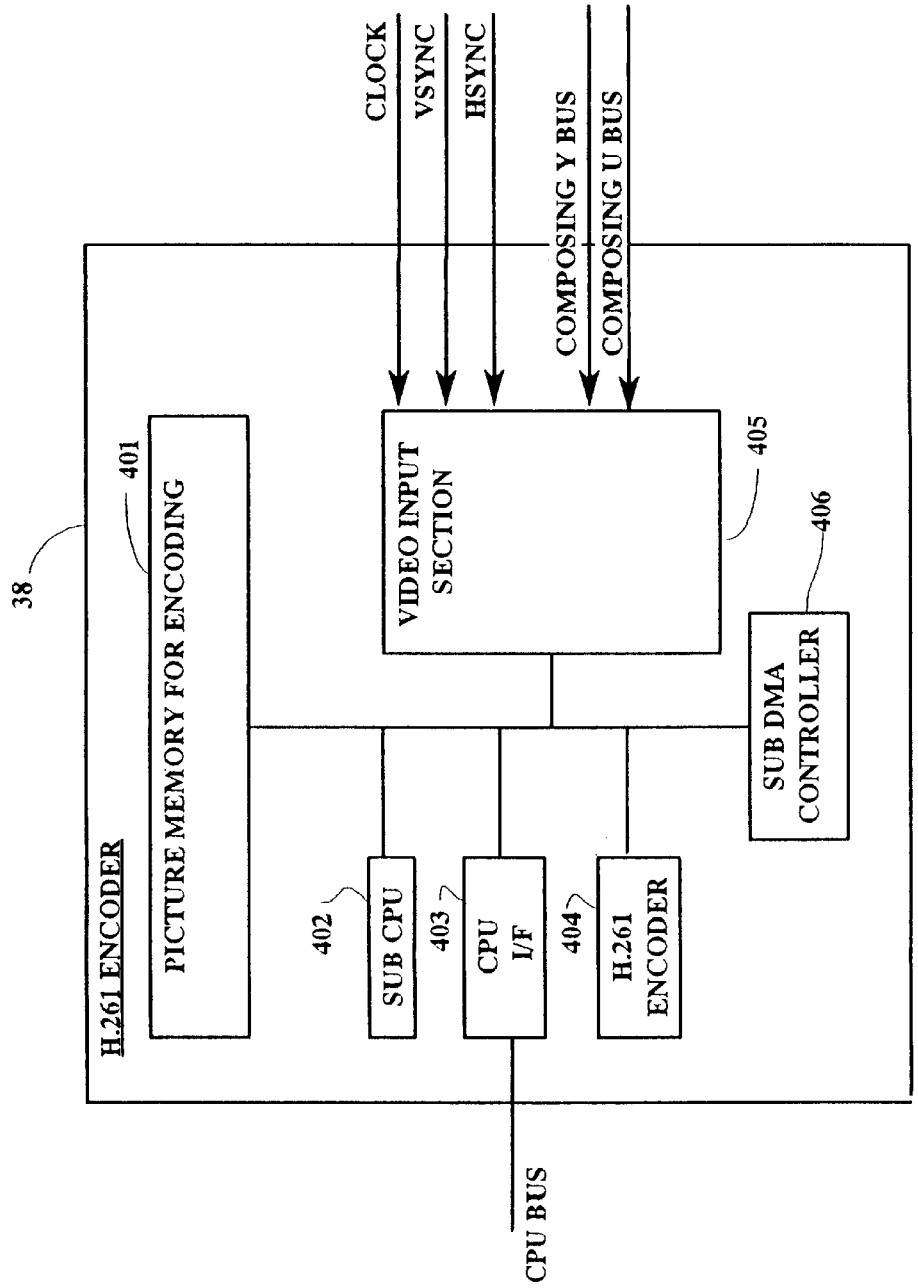
FIG. 14 is a block diagram of a structural example of a H. 261 encoder 38.

FIG. 14 is a block diagram showing a structural example of the H. 261 encoder 38. The sub CPU 402 controls the entire of the H. 261 encoder 38. A video input section 405 receives a composing YUV signal outputted so as not to pile from the gate circuits 390 to 39n. The composing YUV signal inputted to the video input section 405 is coded with the use of the H. 261 algorithm by the H. 261 encoder 404 to generate a H. 261 stream of 16 parallel bits.

A sub DMA controller 406 controls to temporally store the H. 261 stream encoded by the H. 261 encoder 404 in a storage 401 under control of a sub DMA controller 406. The stored H. 261 stream is transmitted to the parallel/serial converter through a CPU interface 403.

Figure 15:
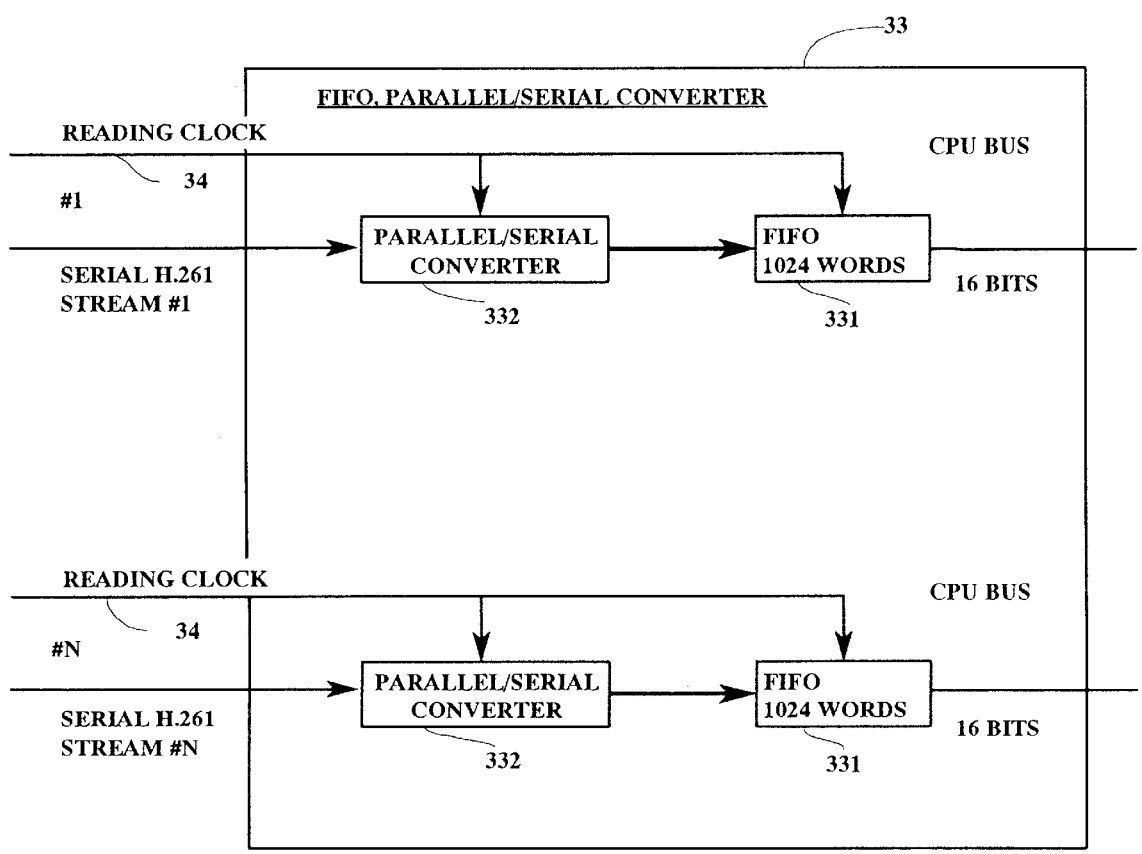
FIG. 15 is a block diagram of a structural example of a parallel/serial converter 33.

FIG. 15 is a block diagram illustrating a structural example of the parallel/serial converter 33. The DMA controller 406 in the H. 261 encoder 38 controls to transmit the H. 261 stream of 16 parallel bits through the CPU interface 403.

Once a stream is transmitted, the stream is written to all the FIFO memories 331 for the N locations in the parallel/ serial converter 33. The H. 261 stream of 16 parallel bits stored in the FIFO memories once is synchronized with reading clocks 34 each of which is independent on the N locations connected from the multi-point control unit 2, and is converted to a serial signal in the parallel/serial converter 332, and is sent to the multi-point control unit 2 as a serial H. 261 stream.

Figure 16:
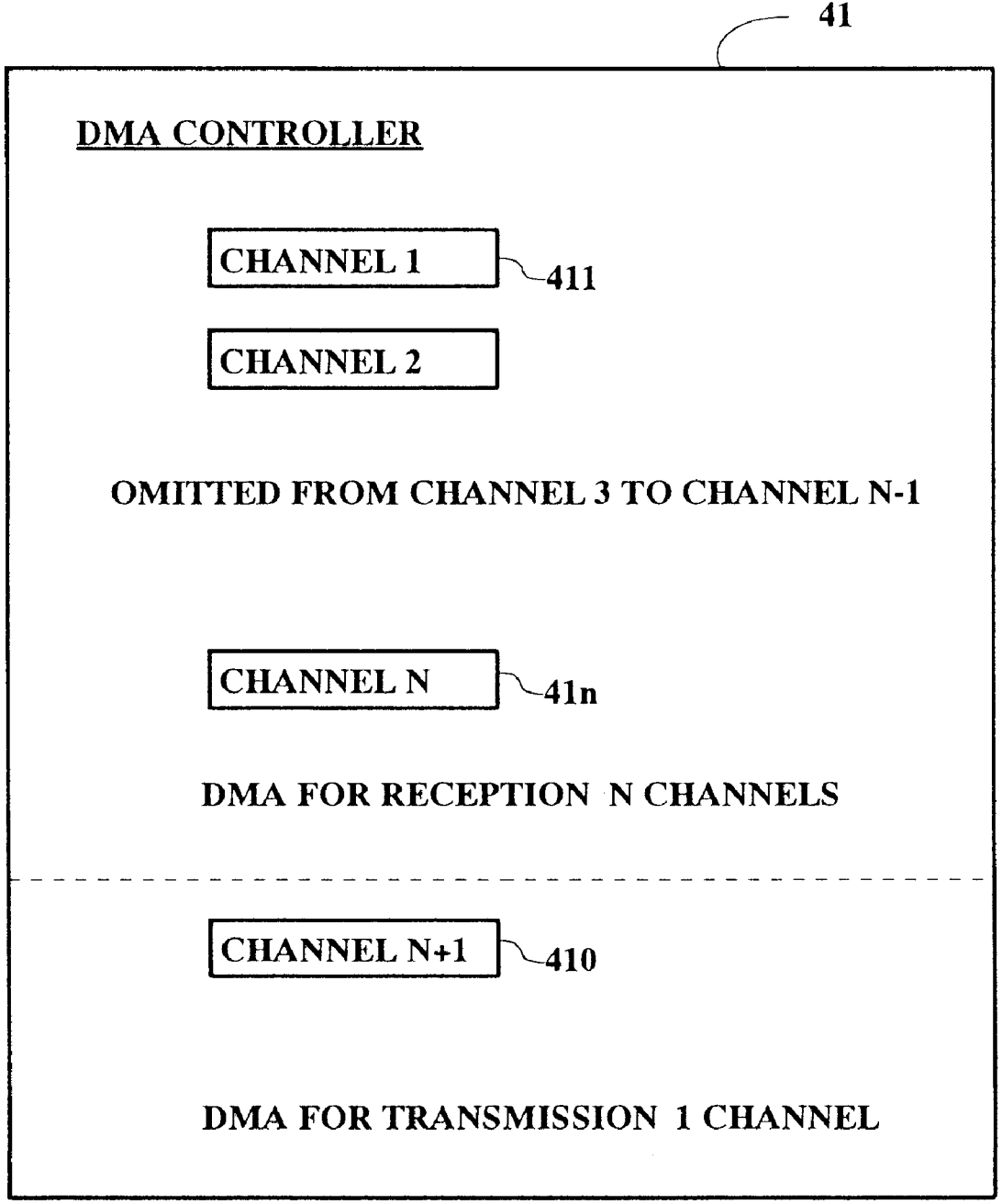
FIG. 16 is a block diagram of a structural example of a DMA controller 41 including channels required for N+1 locations.
Figure 17A:
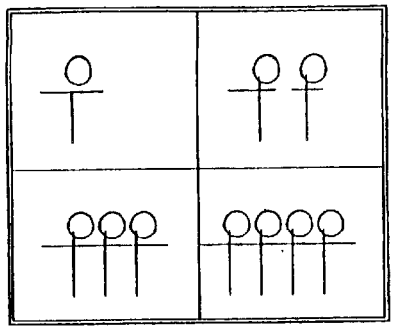
FIGS. 17A to 17F illustrate embodiments of composed patterns of multiple pictures.
Figure 17B:
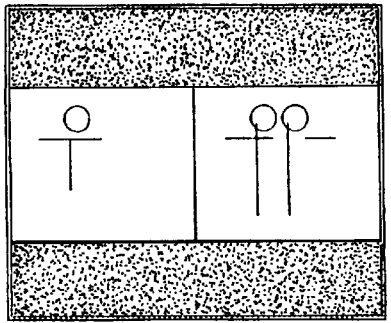
Figure 17C:
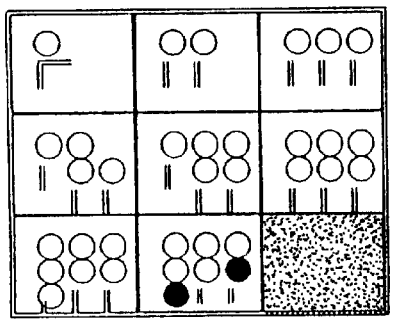
Figure 17D:
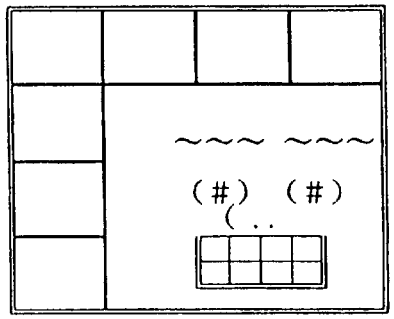
Figure 17E:
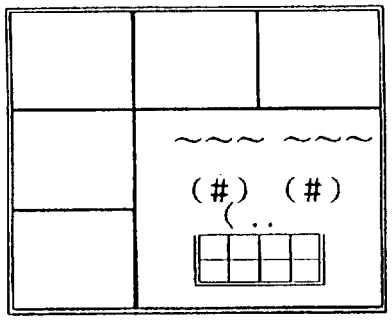
Figure 17F:
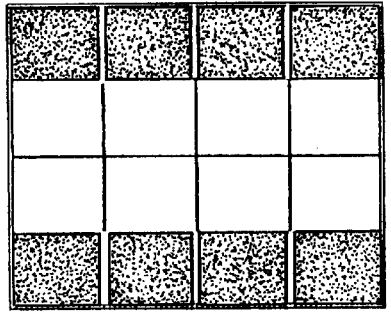

FIG. 16 shows a block diagram of a structural example for giving an outline of the DMA controller 41 having channels for N+1 locations. DMA circuits 411 to 41n required for N channels are employed when receiving the H. 261 stream of the N locations. On the other hand, only a DMA circuit 410 is required when sending the H. 261 stream for the N locations because it is possible to use only one channel as broadcasting for all of N channels.

FIGS. 17A to 17F show an embodiment of a multiple picture composing pattern. In the embodiment, the following patterns are employed:

(a) a pattern of equally dividing a picture into four
(b) a pattern of equally dividing a picture into nine including background color areas in upper and lower sections of the picture.
(c) a pattern of equally dividing a picture into nine including a background color area in right-lower section of a picture.
(d) a pattern of unequally dividing a picture into eight including a speaker image in right-lower section of a picture.
(e) a pattern of unequally dividing a picture into six including a speaker image in right-lower section of a picture.
(f) a pattern of equally dividing a picture into sixteen including background color areas in upper and lower section of a picture.

The multi-point control unit 2 sends the reducing ratio and the information of display position to a CPU 30 of the multiple picture composer 3. Accordingly, the H. 261 decoder 35 thins video signals according to the information of the reducing ratio and reduces the motion picture corresponding to the above-described patterns. Further, enable signals are inputted to the gate circuits 391 to 39n corresponding to the displayed positions on the screen according to the information of the display position.

FIGS. 18A to 18I show steps for composing pictures sent from four locations #1 to #4 selected from eight video conference terminals assumed as an embodiment to equally divide pictures of the four locations into four.

In FIGS. 18A through 18I, for example, each of motion pictures on locations of #1, #2, #3, and #4 are respectively displayed on the top left-hand, the top right-hand, the lower left-hand corner, and the lower right-hand corners of the four-divided screen.

Figure 18A:
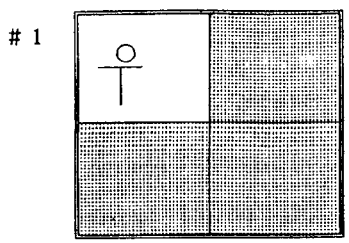
FIGS. 18A to 18I show steps for composing four pictures #1 to #4 sent from the selected four of eight video conference terminals as an embodiment.
Figure 18B:
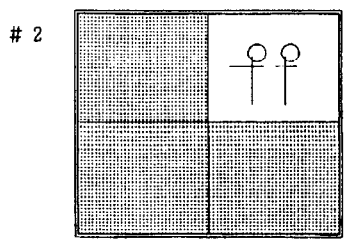
Figure 18C:
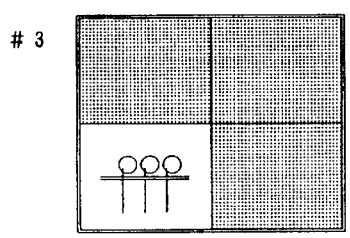
Figure 18D:
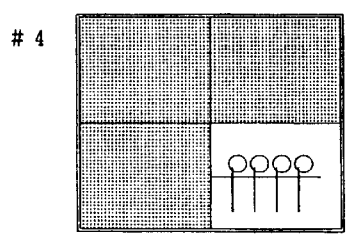
Figure 18E:
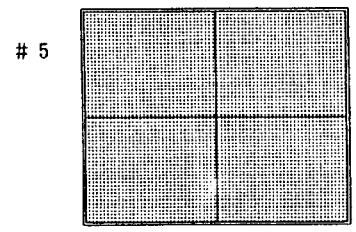
Figure 18F:
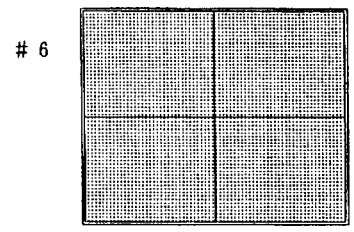
Figure 18G:
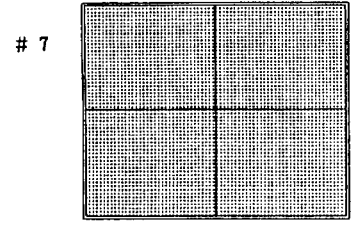
Figure 18H:
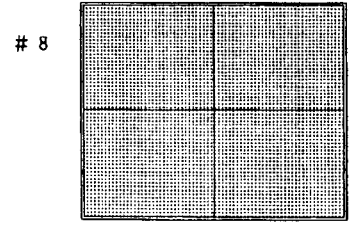
Figure 18I:
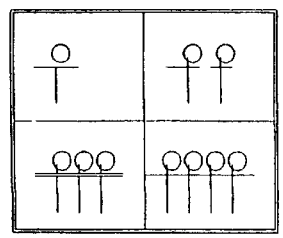

FIG. 18I is a display example of the result of composing motion pictures on the locations #1 to #4. To obtain the display, an output from the H. 261 decoding and scaling section 351 corresponding to the point #1 becomes as shown in FIG. 18A. Similarly, an output from the H. 261 decoding and scaling section 352 becomes as shown in FIG. 18B, an output from the H. 261 decoding and scaling section 351 corresponding to the point #3 becomes as shown in FIG. 18C, and an output from the H. 261 decoding and scaling section 354 corresponding to the point #4 becomes as shown in FIG. 18D.

On the other hand, outputs from the H. 261 decoding and scaling sections 355 to 358 corresponding to the locations #5 to #8 are aborted by the gate circuits 395 to 398 as shown in FIGS. 18E to 18H. Accordingly, the video input section 405 of the H. 261 encoder 38 inputs composed signals of pictures on the locations #1 to #4.

In this way, the composed video signals are commonly sent to the video conference terminals on the locations #1 to #8.

As explained in the embodiments of the present invention in accompanying with the attached drawings, it is possible to increase numbers of the composed pictures, for example, four locations on the conventional system to eight locations with the same scale of a hardware and the same cost as the conventional system when video signals sent from a plurality of terminals are formed into a composed picture on a video conference system according to the present invention.

The present invention may be embodied in other specific forms without departing from the sprit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A video conference system for generating and transmitting composed video signals of multi-parties comprising:
    a plurality of video conference terminals connected via a network;
    a multi-point control unit remotely connected to said plurality of video conference terminals through the network, said multi-point control unit receiving video signals from said plurality of video conference terminals and generating an information signal including a reducing ratio and a display position for each of the received video signals; and
    a multiple picture composer connected to said multi-point control unit and receiving video signals through said multi-point control unit, along with the information generated by the multi-point control unit, and generating a composed video signal which is transmitted back to the video conference terminals via said multi-point control unit, said multiple picture composer comprising:
    reducing means for reducing each of the video signals of said plurality of video conference terminals according to said reducing ratio, and
    a gate circuit section outputting the each of the video signals reduced by the reducing means according to said display position, thereby generating the composed video signal from the video signals sent from said plurality of video conference terminals.

2. The video conference system according to claim 1, wherein said reducing means outputs blank signals corresponding to empty areas generated by reducing the video signals sent from said plurality of video conference terminals, and the multiple picture composer further includes:
    a gate signal generator generating enable signals which control the outputting of the reduced video signals from said gate circuit section according to said blank signals.

3. The video conference system according to claim 2, wherein the multiple picture composer further includes:
    a register storing predetermined color signals for a background of a picture, and
    a second gate circuit outputting said predetermined color signals to inactive display areas where all of the reproduced video signals for said plurality of video conference terminals are not displayed.

4. The video conference system according to claim 3, wherein said second gate circuit outputs said predetermined color signals sent from said register according to accumulated outputs of all blank signals corresponding to said plurality of video conference terminals.

5. The video conference system according to claim 1, wherein the multiple picture composer further comprising a video synchronous signal generator generating a video clock signal, and vertical and horizontal synchronous signals, wherein the reducing means executes reduction of the video signals by thinning said vertical and horizontal synchronous signals of said video signals.

6. The video conference system according to claim 1, wherein video signals transmitted between said multi-point control unit and said multiple picture composer are serial signals having signal formats prescribed in ITU-H.261.

* * * * *